United States Patent
Kastner et al.

(10) Patent No.: US 12,196,274 B2
(45) Date of Patent: Jan. 14, 2025

(54) BELT PULLEY DECOUPLER

(71) Applicant: Schaeffler Technologies AG & Co. KG, Herzogenaurach (DE)

(72) Inventors: Michael Kastner, Erlangen (DE); Andreas Goetz, Wilhelmsdorf (DE); Eugen Bauer, Herzogenaurach (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 0 days.

(21) Appl. No.: 17/766,310

(22) PCT Filed: Sep. 30, 2020

(86) PCT No.: PCT/DE2020/100834
§ 371 (c)(1),
(2) Date: Apr. 4, 2022

(87) PCT Pub. No.: WO2021/069020
PCT Pub. Date: Apr. 15, 2021

(65) Prior Publication Data
US 2024/0052892 A1 Feb. 15, 2024

(30) Foreign Application Priority Data
Oct. 7, 2019 (DE) .............. 10 2019 126 867.2

(51) Int. Cl.
*F16H 55/36* (2006.01)
*F16D 3/12* (2006.01)
*F16D 41/20* (2006.01)

(52) U.S. Cl.
CPC ............ *F16D 3/12* (2013.01); *F16D 41/206* (2013.01); *F16H 55/36* (2013.01); *F16H 2055/366* (2013.01)

(58) Field of Classification Search
CPC ...... F16H 2055/366; F16H 55/36; F16D 3/72; F16D 3/52; F16D 3/12; F16D 41/206; F16F 15/1216
(Continued)

(56) References Cited

U.S. PATENT DOCUMENTS

| 5,156,573 A | 10/1992 | Bytzek |
| 5,626,518 A | 5/1997 | Maki |

(Continued)

FOREIGN PATENT DOCUMENTS

| CN | 103210226 A | 7/2013 |
| DE | 102015202043 A1 | 8/2016 |

(Continued)

*Primary Examiner* — Michael R Mansen
*Assistant Examiner* — Katelynne R Burrell

(57) ABSTRACT

The disclosure relates to a belt pulley decoupler for transmitting torque between the belt of a belt drive and a shaft in driving connection therewith. The belt pulley decoupler includes: a hub fastened to the shaft, a belt pulley rotatably mounted on the hub, a helical torsion spring arranged in a torque flow path between the belt pulley and the hub, a first spring plate extending in the torque flow path on a side of the belt pulley, and a second spring plate rotationally fixed to the hub.

The hub has an imbalance which compensates for an imbalance of the helical torsion spring resulting from a ground portion of the spring ends in such a way that the following relationship applies for the spring imbalance $\vec{U}s$ and the hub imbalance $\vec{U}b$:

$$|\vec{U}s + \vec{U}b| < |\vec{U}s|$$

14 Claims, 4 Drawing Sheets

(58) Field of Classification Search
USPC .......................................................... 474/70
See application file for complete search history.

(56) References Cited

U.S. PATENT DOCUMENTS

| | | | |
|---|---|---|---|
| 6,048,284 A | 4/2000 | Gerhardt | |
| 6,083,130 A | 7/2000 | Mevissen et al. | |
| 8,021,253 B2 * | 9/2011 | Dell | F02N 11/04 |
| | | | 464/57 |
| RE45,156 E | 9/2014 | Jansen et al. | |
| 9,097,335 B2 * | 8/2015 | Serkh | F16D 41/206 |
| 9,097,355 B2 | 8/2015 | Keller | |
| 9,759,274 B2 | 9/2017 | Ward et al. | |
| 10,393,190 B2 * | 8/2019 | Williams | F16D 41/206 |
| 10,443,665 B2 * | 10/2019 | Kastner | F16H 55/36 |
| 2005/0005448 A1 * | 1/2005 | Tan | B21C 23/14 |
| | | | 29/892.3 |
| 2005/0250607 A1 * | 11/2005 | Jansen | F16H 55/36 |
| | | | 474/69 |
| 2015/0027844 A1 * | 1/2015 | Serkh | F16H 55/36 |
| | | | 192/75 |
| 2018/0031057 A1 * | 2/2018 | Kastner | F16D 13/76 |
| 2018/0283489 A1 * | 10/2018 | Faria | F16F 15/1216 |

FOREIGN PATENT DOCUMENTS

| | | |
|---|---|---|
| DE | 102016211141 A1 | 12/2017 |
| DE | 202018000857 U1 | 5/2018 |
| DE | 102017004974 A1 | 11/2018 |
| DE | 102018102373 A1 | 8/2019 |
| EP | 0517185 A2 | 12/1992 |
| EP | 0980479 B1 | 8/2003 |
| EP | 1730425 B1 | 3/2008 |
| JP | 2017115927 A | 6/2017 |
| KR | 100237231 B1 | 1/2000 |
| KR | 20010012309 A | 2/2001 |
| KR | 20170116037 A | 10/2017 |
| KR | 20170131838 A | 11/2017 |
| KR | 20180090277 A | 8/2018 |
| WO | 9850709 A1 | 11/1998 |
| WO | 2004011818 A1 | 2/2004 |

* cited by examiner

BELT PULLEY DECOUPLER

CROSS-REFERENCE TO RELATED APPLICATIONS

This application is the U.S. National Phase of PCT Application No. PCT/DE2020/100834 filed on Sep. 30, 2020, which claims priority to DE 10 2019 126 867.2 filed on Oct. 7, 2019, the entire disclosures of which are incorporated by reference herein.

TECHNICAL FIELD

This disclosure relates to a belt pulley decoupler for transmitting torque between the belt of a belt drive and a shaft in driving connection therewith.

BACKGROUND

Belt pulley decouplers, which are also referred to as decouplers or isolators, are found in particular in the auxiliary belt drive of an internal combustion engine to compensate for the torsional vibrations and irregularities introduced into the belt drive by the crankshaft thereof. Compensation is provided by the decoupling effect of the helical torsion spring, which, depending on the design of the belt pulley decoupler, elastically transfers the torque from the belt pulley to the hub and/or from the hub to the belt pulley. The known designs include:

Belt pulley decouplers that are rotationally fixed to the crankshaft and transmit torque from the crankshaft to the belt. They feature a one-way clutch that allows the belt to overtake the crankshaft when open. Such a belt pulley decoupler is known, for example, from DE 10 2015 202 043 A1 and WO 2004/011818 A1.

Belt pulley decouplers that are rotationally fixed to the shaft of a generator and transmit torque from the belt to the generator shaft. They feature a one-way clutch connected in series with the helical torsion spring, which, when open, allow the generator shaft to overtake the belt. Such a belt pulley decoupler is also known from DE 10 2015 202 043 A1 and also from U.S. Pat. No. 9,759,274 B2 and U.S. RE45,156 E. A generic belt pulley decoupler with a helical torsion spring whose spring ends are obviously ground is disclosed in DE 10 2017 004 974 A1.

Belt pulley decouplers that are rotationally fixed to the shaft of a starter generator and, depending on the operating mode of the starter generator, transmit torque from the belt to the generator shaft or, with reversed direction of rotation, torque from the generator shaft to the belt. Such a belt pulley decoupler is known, for example, from DE 10 2016 211 141 A1 and EP 1 730 425 B1.

SUMMARY

The present disclosure is based on the object of improving the operating behavior of a belt pulley decoupler of the type described above.

The solution thereto arises from the features described herein. According to this, the hub should have an imbalance which compensates for an imbalance of the helical torsion spring resulting from the ground portion of the spring ends in such a way that when the helical torsion spring is torque-free, the relationship holds for the spring imbalance $\vec{U}s$ and the hub imbalance $\vec{U}b$:

$$|\vec{U}s + \vec{U}b| < |\vec{U}s|$$

According to the disclosure, the imbalance of the helical torsion spring and thus of the belt pulley decoupler associated with the ground portion of the spring ends is thus reduced (and ideally eliminated) by the hub also having an imbalance. In this regard, the imbalance vector of the hub is matched in terms of magnitude and direction to the imbalance vector of the helical torsion spring in such a way that the magnitude of the added vectors $\vec{U}s$ and $\vec{U}b$ is smaller than the magnitude of the spring imbalance $\vec{U}s$ and consequently the imbalance of the belt pulley decoupler balanced in this way is significantly reduced.

The balanced belt pulley decoupler exhibits significantly improved vibration behavior, which leads to significantly lower loads on the generator bearing, especially in operational applications with comparatively high generator speeds.

The hub imbalance $\vec{U}b$ can generally originate from any point of the hub. In an example embodiment, the originating location is the spring plate, which is rotationally fixed to the hub and whose diameter is comparatively large compared with the rest of the tube section of the hub, so that an uneven mass distribution of the spring plate is accompanied by a correspondingly large imbalance effect. In a further example embodiment, the originating location is the axial spring support, which, if suitably shaped, enables a particularly successful balancing result.

BRIEF DESCRIPTION OF THE DRAWINGS

Further features of the disclosure are apparent from the following description and from the drawings, in which exemplary embodiments of a belt pulley decoupler according to the disclosure for mounting on the generator of an accessory belt drive of an internal combustion engine are shown. In the figures, the following is shown.

DETAILED DESCRIPTION

Figure 1:
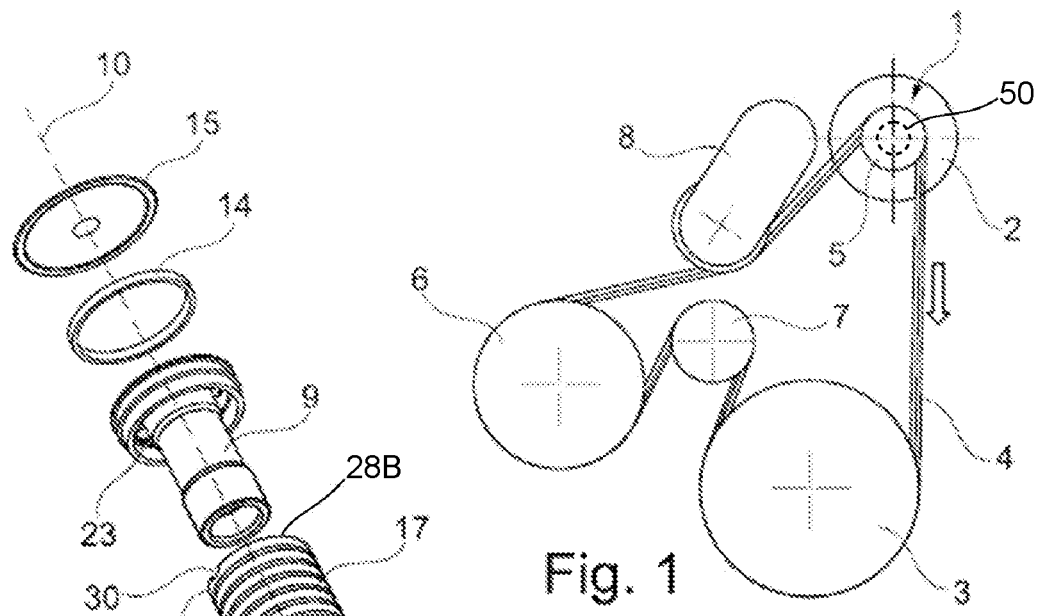
FIG. 1 shows a schematic view of the belt drive.
Figure 2:
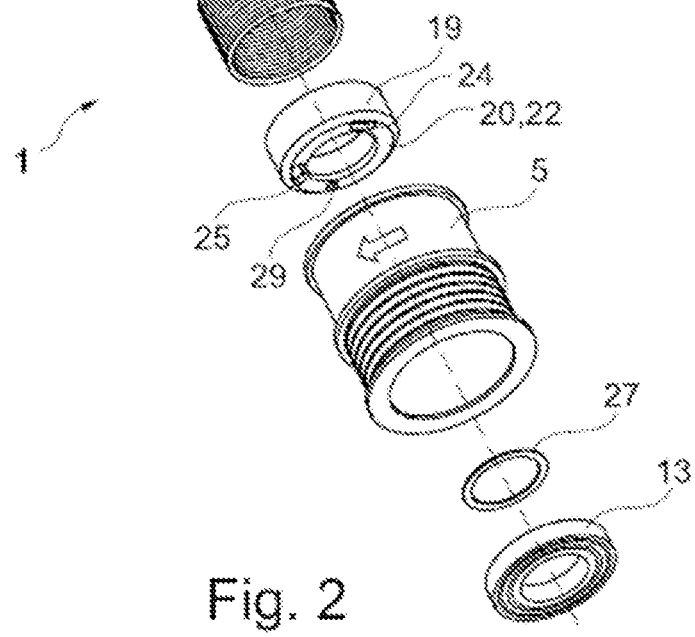
FIG. 2 shows the belt pulley decoupler in an exploded perspective view.

The belt pulley decoupler 1 according to the disclosure is arranged on a shaft 50 of a generator 2 of a belt drive of an internal combustion engine as shown in FIG. 1. The belt 4 driven by the pulley 3 of the crankshaft wraps around the belt pulley 5 of the belt pulley decoupler 1, the belt pulley 6 of an air-conditioning compressor and an idler pulley 7. The belt 4 is pretensioned by means of a belt tensioner 8.

FIGS. 2 and 7 to 9 show the belt pulley decoupler 1 in an exploded view and a hub 9 according to the disclosure as an individual part, respectively. The belt pulley 5, the outer surface of which the belt 4 wraps is profiled to match the poly-V shape of the belt 4, is driven by the belt 4 in the direction of rotation shown in FIG. 2. The belt pulley 5 is designed to be hollow cylindrical and is rotatably mounted around the axis of rotation 10 of the belt pulley decoupler 1 on the hub 9, which is firmly bolted to the shaft 50 of the generator 2. For this purpose, the hub 9 has an internal thread 11 in the central section and an internal multi-tooth 12 at the front end section remote from the generator as an engagement contour for the screwing tool. The belt pulley 5 is mounted on the hub 9 radially and axially at the generator end by means of a rolling bearing and radially at the end remote from the generator by means of a plain bearing. The rolling bearing is a single-row ball bearing 13 sealed on both sides, and the plain bearing is a radial bearing ring 14 made of polyamide, which is in direct sliding contact with the inner diameter of the belt pulley 5.

The belt pulley 5 has a stepped diameter extension at the end remote from the generator, into which a protective cap 15 is snapped after the hub 9 has been screwed onto the generator shaft 50.

The components essential to the function of the belt pulley decoupler 1 are a one-way clutch designed as a wrap spring 16 and a helical torsion spring 17 connected in series with the wrap spring 16 with respect to a torque flow path from the belt pulley 5 to the hub 9. The wrap spring 16 and the helical torsion spring 17 extend coaxially with respect to one another in the direction of the axis of rotation 10, wherein the wrap spring 16 is arranged radially between the belt pulley 5 and the helical torsion spring 17 and consequently surrounds the helical torsion spring 17.

The wrap spring 16 is in the closed coupling state when the helical torsion spring 17 transmits torque from the belt pulley 5 to the hub 9 in a first direction of rotation according to the direction of the arrow shown. As a result of the decoupling elasticity of the helical torsion spring 17, torsional vibrations of the belt pulley 5 are transmitted to the hub 9 to a strongly smoothed extent. Both the wrap spring 16 wound on the right and the helical torsion spring 17 wound on the left have ends without legs on both sides, which load the wrap spring 16 or the helical torsion spring 17 in the winding opening direction when the torque is transmitted to the generator shaft 50, thereby expanding them radially. In the process, the first wrap spring end running in the torque flow path on the side of the belt pulley 5 is braced against the inner circumferential surface of a cylindrical drive sleeve 18, which is rotationally fixed in the belt pulley 5 by means of an interference fit. The second end of the wrap spring extending in the torque flow path on the part of the helical torsion spring 17 is braced against the inner circumferential surface of a coupling sleeve 19, which is rotatably mounted in the drive sleeve 18 about the axis of rotation 10 relative to the belt pulley 5 and the hub 9. The coupling sleeve 19 is manufactured with a base 20 as a single-piece sheet metal formed part and rotates essentially without imbalance.

The helical torsion spring 17 rests axially with its spring ends 21A, 21B against spring plates 22 and 23. The first spring plate 22 on the drive side, i.e., the one running in the torque flow path on the side of the belt pulley 5, is formed by the base 20. The second spring plate 23 on the output side, i.e., running in the torque flow path on the side of the hub 9, is rotationally fixed to the hub 9 and is a rotationally fixed part of the hub 9.

The spring plates 22, 23 have axially ramping spring supports corresponding to the axial face contour of the helical torsion spring 17 and receding at circumferential rotational stops. The axial spring support of the coupling sleeve 19 is formed by a plurality of projections 24 and 25 formed in the base 20, the highest projection 25 of which forms the rotational stop of the first spring plate 22. The rotational stop 26 of the second spring plate 23 can be seen in FIGS. 7 to 9. The axial forces of the helical torsion spring 17 acting on the coupling sleeve 19 are supported by a plain bearing ring 27 on the inner ring of the ball bearing 13.

The torque transmitted to the generator shaft 50 is introduced into the helical torsion spring 17 on the drive side via the pressure contact of the rotational stop 25 on the coupling sleeve 19 with a first circumferential end face 28A of one spring end 21A. The torque transmission on the output side is handled via the pressure contact of a second circumferential end face 28B of the other spring end 21B with the rotational stop 26 of the second spring plate 23.

When the clutch is open, the wrap spring 16 slips in the drive sleeve 18 and/or in the coupling sleeve 19 and allows the (inert) generator shaft 50 and the hub 9 mounted thereon to overtake the belt pulley 5. The drag torque corresponding to the sliding friction between the two slipping contact partners is transmitted by the helical torsion spring 17 from the hub 9 to the belt pulley 5 in a second direction of rotation, which is opposite to the first direction of rotation. The drag torque therefore acts on the spring ends 21A, 21B in the sense of a relative rotation of their circumferential end faces 28A, 28B spaced circumferentially from the associated rotational stops 25, 26. This undesirable ramp-up of the helical torsion spring 17 is positively prevented by the fact that both spring plates 22, 23 are provided with projections 29 in the region of their axial spring supports (see FIG. 8), which engage in respective recesses 30 of the helical torsion spring 17.

Figure 3:
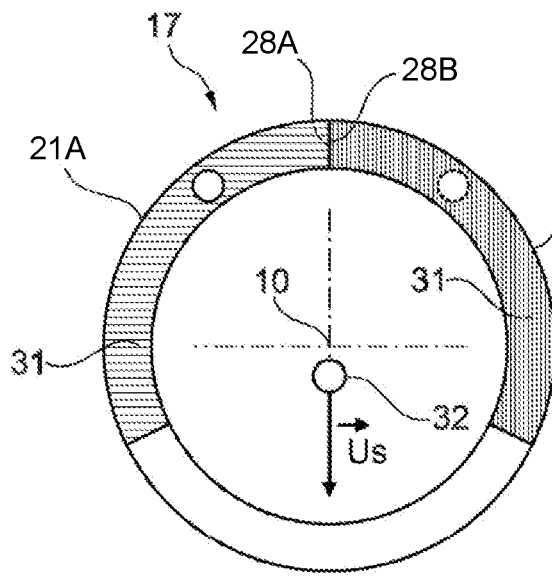
FIG. 3 shows a schematic top view of the helical torsion spring of the belt pulley decoupler.

FIG. 3 shows the helical torsion spring 17 in a schematic top view of the ground spring ends 21A, 21B. The ground portion 31 shown hatched for the front and rear sides of the spring is such that the axial end faces of the spring ends 21A, 21B in the ground peripheral region run in a plane perpendicular to the axis of rotation 10. The number of windings of the helical torsion spring 17 is an integer, and the grinding of the spring ends 21A, 21B is accompanied by local mass reductions, each symbolized by a white circle. The corresponding eccentric position of the spring mass center 32 and the associated spring imbalance $\vec{U}s$ are symbolized by the black circle and/or the imbalance vector emanating from it. This consideration also always applies to the torque-free, i.e., operationally non-torqued helical torsion spring 17 in the following explanations.

According to the disclosure, the belt pulley decoupler 1 is balanced with an imbalance attached to the hub 9 which (partially) compensates for the spring imbalance $\vec{U}s$ such that the resulting imbalance is smaller than a maximum permissible imbalance of the belt pulley decoupler 1. The permissible imbalance is typically 40 gmm.

Figure 4A:
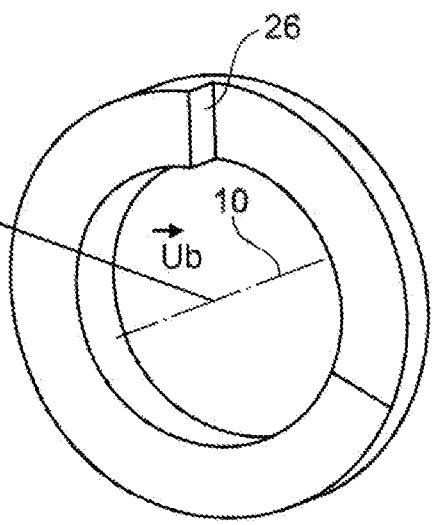
FIGS. 4a-c each show a schematic view of the ramp shape of the axial spring support on the second spring plate: 4a) uninterrupted ramp shape according to the background of the art, 4b) interrupted ramp shape with three annular ring pieces, and 4c) interrupted ramp shape with two annular ring pieces.
Figure 4B:
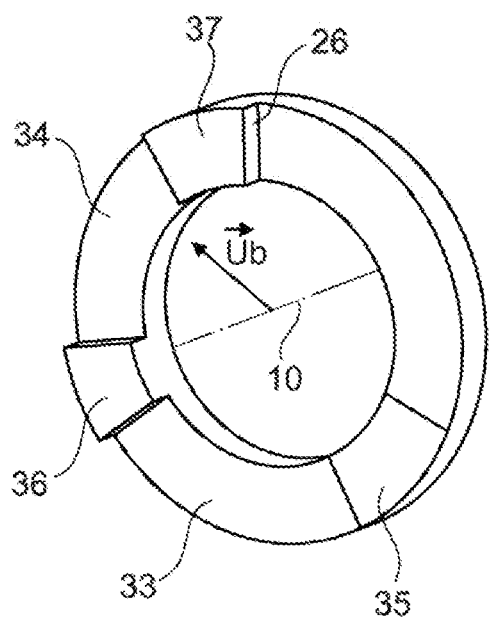
Figure 4C:
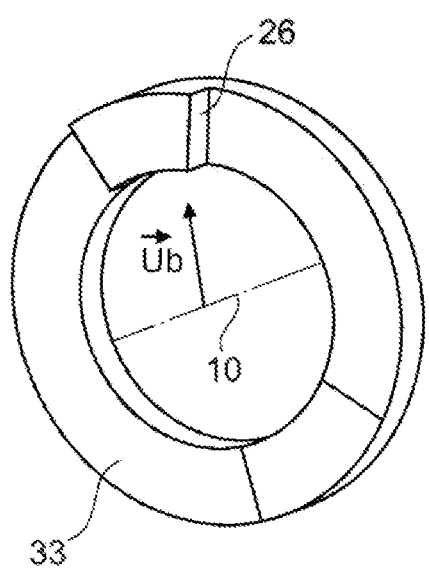
Figure 10:
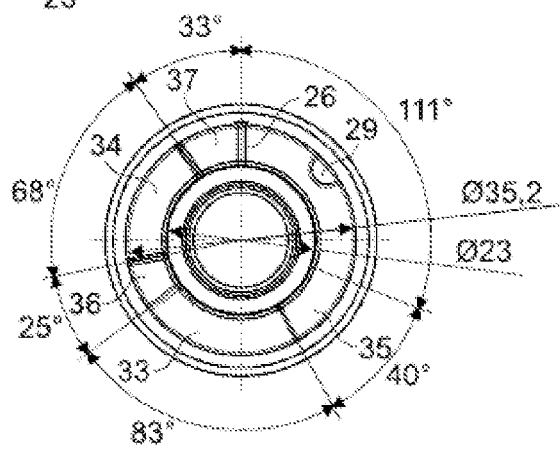
FIG. 10 shows the axial spring support of the spring plate according to FIGS. 7 to 9 with dimensions.

In the exemplary embodiments explained below, the hub imbalance shown with $\vec{U}b$ in FIGS. 4*a-c* is generated by the shaping of the second spring plate 23 and specifically by the shaping of the axial spring support. FIGS. 4*a-c* each show the spring support schematically as an annular ring, wherein FIG. 4a shows a spring support known essentially from DE 10 2015 202 043 A1 or U.S. RE45,156 E and FIGS. 4b and 4c show spring supports balancing spring plates 23 according to the disclosure. Starting from the rotational stop 26, the spring supports are axially ramp-free up to a circumferential angle of 111° (see FIG. 10) corresponding to the ground spring end 21B, and they rise in the circumferential area between 111° and 360° in a ramp-like manner around the axial dimension of the rotational stop 26 shown in FIG. 9, corresponding to the unground spring windings.

FIG. 4a: the axial spring support is uninterrupted around the entire circumference of the annular ring.

FIG. 4b: the axial spring support is interrupted in the axially ramping circumferential area between 111° and 360° by two recesses 33 and 34, which the helical torsion spring 17 spans in a cantilevered manner. The bottom of the recesses 33, 34 is in a plane with the axially ramp-free circumferential area between 0° and 111°. The shape of the recesses 33, 34 is such that the axially ramping spring support comprises three annular ring sections 35, 36 and 37 spaced circumferentially around the recesses 33, 34. The hub imbalance $\vec{U}b$ resulting from the recesses 33, 34 is significantly smaller than the imbalance vector according to FIG. 4a and is rotated towards the rotational stop 26.

FIG. 4c: the axial spring support is interrupted in the axially ramping circumferential area between 111° and 360° by only one recess 33. The resulting hub imbalance $\vec{U}b$ is slightly smaller than the imbalance vector shown in FIG. 4b and is rotated even further towards the rotational stop 26.

Figure 5:
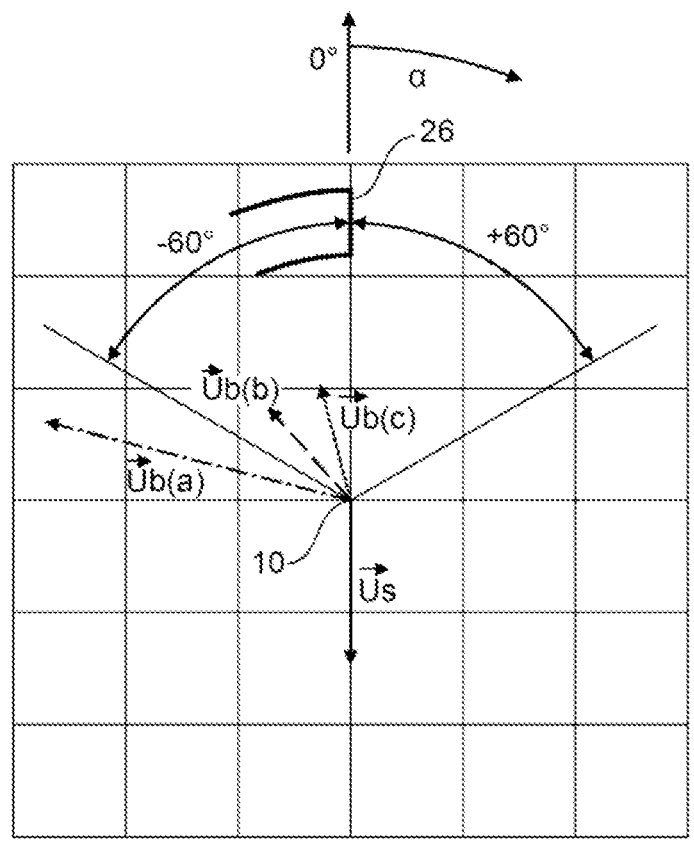
FIG. 5 shows the imbalances of the helical torsion spring and the hubs with the ramp shapes according to FIG. 4 in a vectorial representation.
Figure 6:
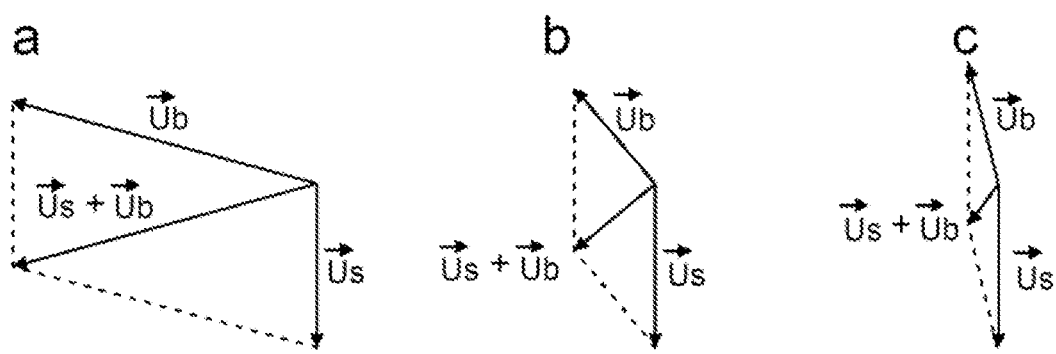
FIG. 6 show the imbalance pairs with ramp shapes a), b) and c) according to FIGS. 4 and 5 as a vector addition.
Figure 7:
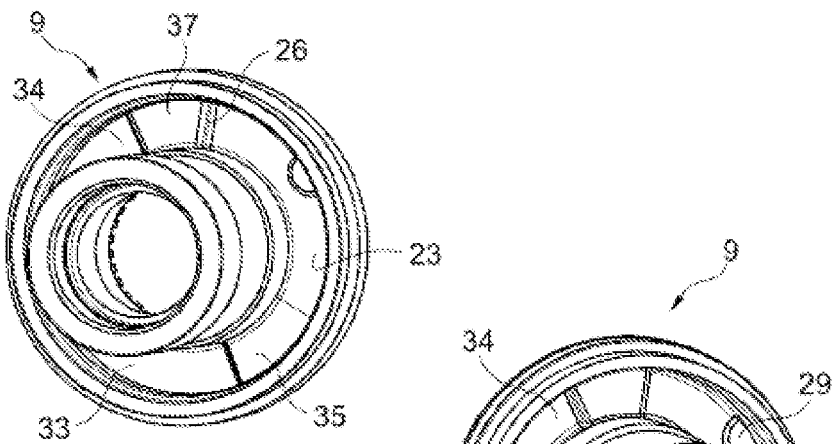
FIG. 7 shows a first perspective top view of the spring plate according to FIG. 4b.
Figure 8:
FIG. 8 shows a second perspective top view of the spring plate according to FIG. 4b.
Figure 9:
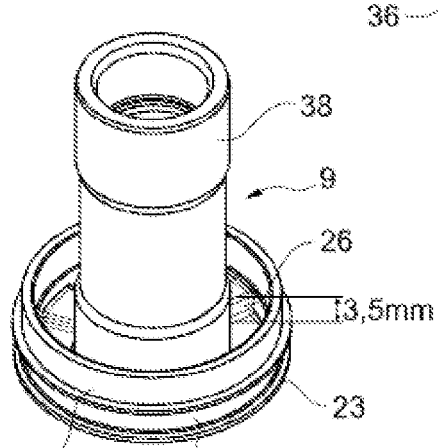
FIG. 9 shows a third perspective top view of the spring plate according to FIG. 4b.

FIGS. 5 and 6 illustrate the reduction of the imbalance of the belt pulley decoupler 1 based on the spring grinding according to the disclosure with the aid of a graphical vector representation of the imbalances $\vec{U}s$, $\vec{U}b$ or in each case their sum $\vec{U}s+\vec{U}b$. The letters a to c in brackets refer to the axial spring supports shown in FIGS. 4a to 4c.

FIG. 5 shows the imbalance vectors drawn in FIGS. 3 and 4 and explained above as a function of a circumferential angle referred to the axis of rotation 10, which equates to α=0° for the rotational stop 26. Unlike the known hub imbalance $\vec{U}b$ (a), the hub imbalances $\vec{U}b$ (b) and $\vec{U}b$ (c) resulting from the recesses 33, 34 according to the disclosure are aligned within a annular sector of α=±60° about the axis of rotation 10 and clearly counteract the spring imbalance $\vec{U}s$ of the (torque-free) helical torsion spring 17, which is aligned towards α=180°.

The associated vector addition according to FIG. 6a clearly shows that the uninterrupted ramp shape of the known spring support according to FIG. 4a even leads to an added imbalance $\vec{U}s+\vec{U}b$, the amount of which $|\vec{U}s+\vec{U}b|$ is significantly greater than $|\vec{U}s|$ and approximately twice as large according to the following table (45.3 gmm vs. 23.7 gmm). The vector addition according to FIGS. 6b and 6c and the associated table values, on the other hand, illustrate the significant balancing effect of the hub imbalances $\vec{U}b$ (b) and $\vec{U}b$ (c) according to the disclosure in such a way that the following relationship of the vector quantities applies there, at least with the helical torsion spring 17 not twisted in operation: $|\vec{U}s+\vec{U}b|$=15.5 gmm or 7.8 gmm<$|\vec{U}s|$=23.7 gmm.

|  | Imbalance $\vec{U}$ | |
| --- | --- | --- |
|  | Magnitude [gmm] | Direction [α] |
| Helical torsion spring | 23.7 | 180° |
| Hub a | 45.2 | 285° (−75°) |
| Spring + hub a | 45.3 | 255° |
| Hub b | 18.1 | 319° (−41°) |
| Spring + hub b | 15.5 | 230° |
| Hub c | 17.5 | 346° (−14°) |
| Spring + hub c | 7.8 | 212° |

The operational torsion of the helical torsion spring 17 causes the spring imbalance $\vec{U}s$ to rotate counterclockwise and become smaller in FIGS. 5 and 6. However, the vector sum $\vec{U}s+\vec{U}b$ can only change at a very large torsion angle so that the following applies to its magnitude: $|\vec{U}s+\vec{U}b|>|\vec{U}s|$ FIGS. 7 to 10 show an embodiment of a hub 9 according to the disclosure as shown in FIG. 4b in a perspective and a dimensioned view. The hub 9 is manufactured in one piece with the second spring plate 23 formed thereon, the recesses 33 and 34 formed therein and the projection 29 as an extruded part. The recesses 33, 34 are dimensioned with a view to providing sufficiently large axial support for the helical torsion spring 17 so that all three axially ramping annular ring sections 35, 36, 37 have an arc length of β>20°.

The recesses 33, 34 producing the balancing hub imbalance $\vec{U}b$ have another significant advantage which relates to the manufacturing process of the hub 9. This advantage consists of the fact that the extrusion of the axial ramp shape of the spring support with the comparatively short arc lengths of the annular ring pieces 35, 36, 37 is accompanied by a considerably lower skewing (perpendicularity deviation) of the tube section 38 of the hub 9 which rises axially with respect to the spring plate 23.

The hub imbalance $\vec{U}b$ generated by the recesses 33, 34 can optionally be increased by reducing the mass at the outer circumference of the spring plate 23. This can be done, for example, by means of one or more transverse bores (which do not exist in the present case) which are made in an angular range of α=90° to α=180° remote from the rotational stop 26 on the collar 39 next to the groove 40 for the radial bearing ring 14.

The invention claimed is:

1. A belt pulley decoupler for transmitting torque between a belt of a belt drive and a shaft in driving connection therewith, the belt pulley decoupler comprising:
   a hub configured to be fastened to the shaft,
   a belt pulley rotatably mounted on the hub about an axis of rotation of the belt pulley decoupler,
   a helical torsion spring arranged in a torque flow path between the belt pulley and the hub, the helical torsion spring having ground spring ends,
   a first spring plate extending in the torque flow path on a side of the belt pulley and having a first axial spring support configured for a first spring end, and a first circumferential end face of the first spring end contacting and transmitting a torque to a first rotational stop of the first spring plate, and
   a second spring plate rotationally fixed to the hub, the second spring plate having a second axial spring support for a second spring end, and a second circumferential end face of the second spring end contacting and transmitting a torque to a second rotational stop of the second spring plate, and the hub has an imbalance configured to compensate for an imbalance of the helical torsion spring, the imbalance resulting from a ground portion of the first and second spring ends so that, in a torque-free state of the helical torsion spring, a spring imbalance Us and a hub imbalance $\vec{U}b$ satisfy the following equation:

$$|\vec{U}s+\vec{U}b|<|\vec{U}s|.$$

2. The belt pulley decoupler of claim 1, wherein:

the hub imbalance $\vec{U}b$ is aligned within an annular sector defined by α=±60° around the axis of rotation, the second rotational stop of the second spring plate is defined by α=0° such that the second rotational stop is centered within the annular sector, and in the torque-free state of the helical torsion spring, the spring imbalance $\vec{U}s$ is defined by α=180°.

3. The belt pulley decoupler of claim 1, wherein the second axial spring support of the second spring plate rises axially so as to define a circumferential ramp having an axial dimension equal to an axial dimension of the second rotational stop, wherein the hub imbalance $\vec{U}b$ results from at least one recess configured to interrupt the circumferential ramp of the second axial spring support.

4. The belt pulley decoupler of claim 3, wherein the hub with the second spring plate formed thereon and the at least one recess formed therein is an extruded part.

5. The belt pulley decoupler of claim 3, wherein the second axial spring support of the second spring plate comprises annular ring pieces circumferentially spaced apart from one another via the at least one recess.

6. The belt pulley decoupler of claim 5, wherein an arc length β of the annular ring pieces is greater than 20°.

7. The belt pulley decoupler of claim 1, wherein the axial spring support of the second spring plate rises axially so as to define a circumferential ramp having an axial dimension equal to an axial dimension of the second rotational stop, wherein the hub imbalance results from at least one recess configured to interrupt the circumferential ramp of the second axial spring support.

8. The belt pulley decoupler of claim 7, wherein the second axial spring support of the second spring plate comprises annular ring pieces circumferentially spaced apart from one another around the at least one recess.

9. The belt pulley decoupler of claim 8, wherein an arc length β of the annular ring pieces is greater than 20°.

10. A belt pulley decoupler for transmitting torque between a belt of a belt drive and a shaft in driving connection therewith, the belt pulley decoupler comprising:

a hub configured to be fastened to the shaft, a belt pulley rotatably mounted on the hub, a helical torsion spring arranged in a torque flow path between the belt pulley and the hub, the helical torsion spring having ground spring ends, a first spring plate arranged within the torque flow path, the first spring plate having a first axial spring support configured for a first spring end of the helical torsion spring, and the first spring end configured to contact and transmit a torque to a first rotational stop of the first spring plate, and a second spring plate rotationally fixed to the hub, the second spring plate having a second axial spring support for a second spring end of the helical torsion spring, and the second spring end contacting and transmitting a torque to a second rotational stop of the second spring plate, and the hub has an imbalance configured to compensate for an imbalance of the helical torsion spring, such that in a torque-free state of the helical torsion spring, a spring imbalance $\vec{U}s$ and a hub imbalance $\vec{U}b$ satisfy the following equation:

$$|\vec{U}s+\vec{U}b|<|\vec{U}s|.$$

11. The belt pulley decoupler of claim 10, wherein:

a vector of the hub imbalance is aligned within an annular sector defined by α=±60° around an axis of rotation of the belt pulley decoupler, the second rotational stop of the second spring plate is defined by α=0° such that the second rotational stop is centered within the annular sector, and in the torque-free state of the helical torsion spring, a vector of the spring imbalance is defined by α=180°.

12. A belt pulley decoupler for transmitting torque between a belt of a belt drive and a shaft in driving connection therewith, the belt pulley decoupler comprising:

a hub configured to be fastened to the shaft, a belt pulley rotatably mounted on the hub, a helical torsion spring arranged in a torque flow path between the belt pulley and the hub, the helical torsion spring having ground spring ends, a first spring plate arranged within the torque flow path, the first spring plate having a first axial spring support configured for a first spring end of the helical torsion spring, and the first spring end configured to contact and transmit a torque to a first rotational stop of the first spring plate, and a second spring plate rotationally fixed to the hub, the second spring plate having a second axial spring support for a second spring end of the helical torsion spring, and the second spring end contacting and transmitting a torque to a second rotational stop of the second spring plate, and the second axial spring support is configured with a circumferential axial ramp having at least two annular ramped ring pieces interrupted by at least one recess, and a sum of: i) a magnitude of a first imbalance vector of the hub, and ii) a magnitude of a second imbalance vector of the helical torsion spring, is less than a magnitude of the second imbalance vector of the helical torsion spring.

13. The belt pulley decoupler of claim 12, wherein the at least one recess has a ramp-free bottom.

14. The belt pulley decoupler of claim 12, wherein each of the first and second axial spring supports include at least one projection configured to engage in corresponding recesses of the helical torsion spring.

* * * * *